US012761521B2

(12) United States Patent
Cheng et al.

(10) Patent No.: US 12,761,521 B2

(45) Date of Patent: Oct. 13, 2026

(54) ELECTROPHORETIC DISPLAY DEVICE

(71) Applicant: E Ink Holdings Inc., Hsinchu (TW)

(72) Inventors: Hsiao-Lung Cheng, Hsinchu (TW); Pei-Lin Tien, Hsinchu (TW); I-Shin Lo, Hsinchu (TW); Chi-Mao Hung, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 199 days.

(21) Appl. No.: 18/888,159

(22) Filed: Sep. 18, 2024

(65) Prior Publication Data

US 2025/0013117 A1 Jan. 9, 2025

Related U.S. Application Data

(63) Continuation of application No. 17/369,984, filed on Jul. 8, 2021, now abandoned.

(30) Foreign Application Priority Data

Aug. 20, 2020 (TW) ................................ 109128360

(51) Int. Cl.

*G02F 1/1676* (2019.01)
*G02F 1/167* (2019.01)
*G02F 1/16762* (2019.01)

(52) U.S. Cl.

CPC ............ *G02F 1/1676* (2019.01); *G02F 1/167* (2013.01); *G02F 1/16762* (2019.01)

(58) Field of Classification Search

None

See application file for complete search history.

(56) References Cited

U.S. PATENT DOCUMENTS

2003/0117016 A1* 6/2003 Ukigaya .............. G09G 3/3446 305/107
2003/0231162 A1* 12/2003 Kishi ...................... G02F 1/167 345/107
2022/0057688 A1* 2/2022 Cheng ................. G02F 1/16762

FOREIGN PATENT DOCUMENTS

CN 1416007 5/2003
CN 102654712 9/2012
CN 109656076 4/2019

OTHER PUBLICATIONS

"Office Action of China Counterpart Application", issued on Feb. 14, 2025, p. 1-p. 6.

* cited by examiner

*Primary Examiner* — Phu Vu

(74) *Attorney, Agent, or Firm* — JCIPRNET

(57) ABSTRACT

An electrophoretic display device includes a substrate, an electrophoretic display film, a plurality of second electrodes, and a plurality of third electrodes. The electrophoretic display film is disposed on the substrate and includes a display medium layer and a first electrode. The second electrodes and the third electrodes are disposed on the substrate and located between the display medium layer and the substrate. A first voltage received by each of the second electrodes is controlled by a corresponding thin-film transistor. The third electrodes and the second electrodes are alternately disposed in a direction. The first voltage is different from a second voltage received by the third electrodes.

7 Claims, 3 Drawing Sheets

ELECTROPHORETIC DISPLAY DEVICE

CROSS-REFERENCE TO RELATED APPLICATION

This application is a continuation application of and claims the priority benefit of a prior application Ser. No. 17/369,984, filed on Jul. 8, 2021, which claims the priority benefit of Taiwan application serial no. 109128360, filed on Aug. 20, 2020. The entirety of the above-mentioned patent application is hereby incorporated by reference herein and made a part of this specification.

BACKGROUND OF THE INVENTION

Field of the Invention

The invention relates to a display device, and in particular to an electrophoretic display device.

Description of Related Art

In recent years, electrophoretic display devices are widely used in e-readers (e.g., e-books, e-newspapers) or other electronic elements (e.g., e-shelf labels (ESL)) due to advantages such as lightness, thinness, durability, and low power consumption in accordance with energy conservation and environmental protection.

In the existing electrophoretic display device, the horizontal spacing between two adjacent display electrodes is very close, wherein the thickness of the display medium layer is, for example, about 23 microns, and the horizontal spacing between two adjacent display electrodes is, for example, about 12 microns. At this time, the vertical electric field between the common electrode and the display electrode is 1 E, and the electric field at the horizontal spacing between two adjacent display electrodes is 4 E. That is, the conductive particles between the horizontal spacings are moved horizontally instead of vertically, so that the electrophoretic display device is prone to blooming effect.

In order to solve the issue above, currently, the horizontal spacing between two adjacent display electrodes is increased from 23 micrometers to 56 micrometers, and the electric field at the horizontal spacing is reduced to 0.82 E. In other words, the electric field at the increased horizontal spacing is very weak. Therefore, if the electrophoretic display device is applied to a low-temperature environment, the conductive particles located near the electric field may not be moved, resulting in the issue of white lines. Therefore, how to solve the blooming effect of the electrophoretic display device, while also being applicable to high and low temperature operating environments, is a technical issue that requires urgent attention.

SUMMARY OF THE INVENTION

The invention provides an electrophoretic display device that may effectively reduce blooming effect, may be applied in a low temperature environment, and may have a wider temperature operating range.

The electrophoretic display device of the invention includes a substrate, an electrophoretic display film, a plurality of second electrodes, and a plurality of third electrodes. The electrophoretic display film is disposed on the substrate and includes a display medium layer and a first electrode. The second electrodes are separately disposed on the substrate and located between the display medium layer and the substrate. A first voltage received by each of the second electrodes is controlled by a corresponding thin-film transistor. The third electrodes are disposed on the substrate and located between the display medium layer and the substrate. The third electrodes and the second electrodes are alternately disposed in a direction. The first voltage is different from a second voltage received by the third electrodes. The third electrodes are a plurality of barrier electrodes which are not controlled by thin-film transistors under the display medium layer.

In an embodiment of the invention, the first electrode receives the second voltage.

In an embodiment of the invention, an extending direction of the second electrodes is parallel to an extending direction of a data line.

In an embodiment of the invention, a horizontal spacing between two adjacent second electrodes is between 6 μm and 45 μm.

In an embodiment of the invention, a horizontal spacing between each of the third electrodes and two adjacent second electrodes is the same.

In an embodiment of the invention, a width of each of the third electrodes is equal to the horizontal spacing.

In an embodiment of the invention, a material of the third electrodes is the same as a material of the second electrodes.

In an embodiment of the invention, the first electrode is a common electrode, and the second electrodes are a plurality of display electrodes. Materials of any two of the first electrode, the second electrodes, and the third electrodes are the same.

In an embodiment of the invention, the second electrodes are arranged in an array, and a shape of each of the third electrodes is a strip.

In an embodiment of the invention, the second electrodes are arranged in an array and the third electrodes are arranged in a grid shape, and the second electrodes and the third electrodes are all alternately arranged in the direction and another direction perpendicular to the direction.

Based on the above, in the design of the electrophoretic display device of the invention, the third electrodes and the second electrodes are alternately arranged in the direction, and the first voltage received by the second electrodes is different from the second voltage received by the third electrodes. In this way, the configuration of the third electrodes may block the horizontal electric field between two adjacent second electrodes, so as to avoid the generation of blooming effect. In addition, because the invention adopts the third electrodes instead of increasing the horizontal spacing between two adjacent second electrodes, the invention does not generate a weak electric field area between two adjacent second electrodes. Therefore, the invention is suitable to be driven at low temperatures. In short, the electrophoretic display device of the invention may effectively reduce blooming effect and has high resolution, and may also be used in a low-temperature environment and may have a wider temperature operating range.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
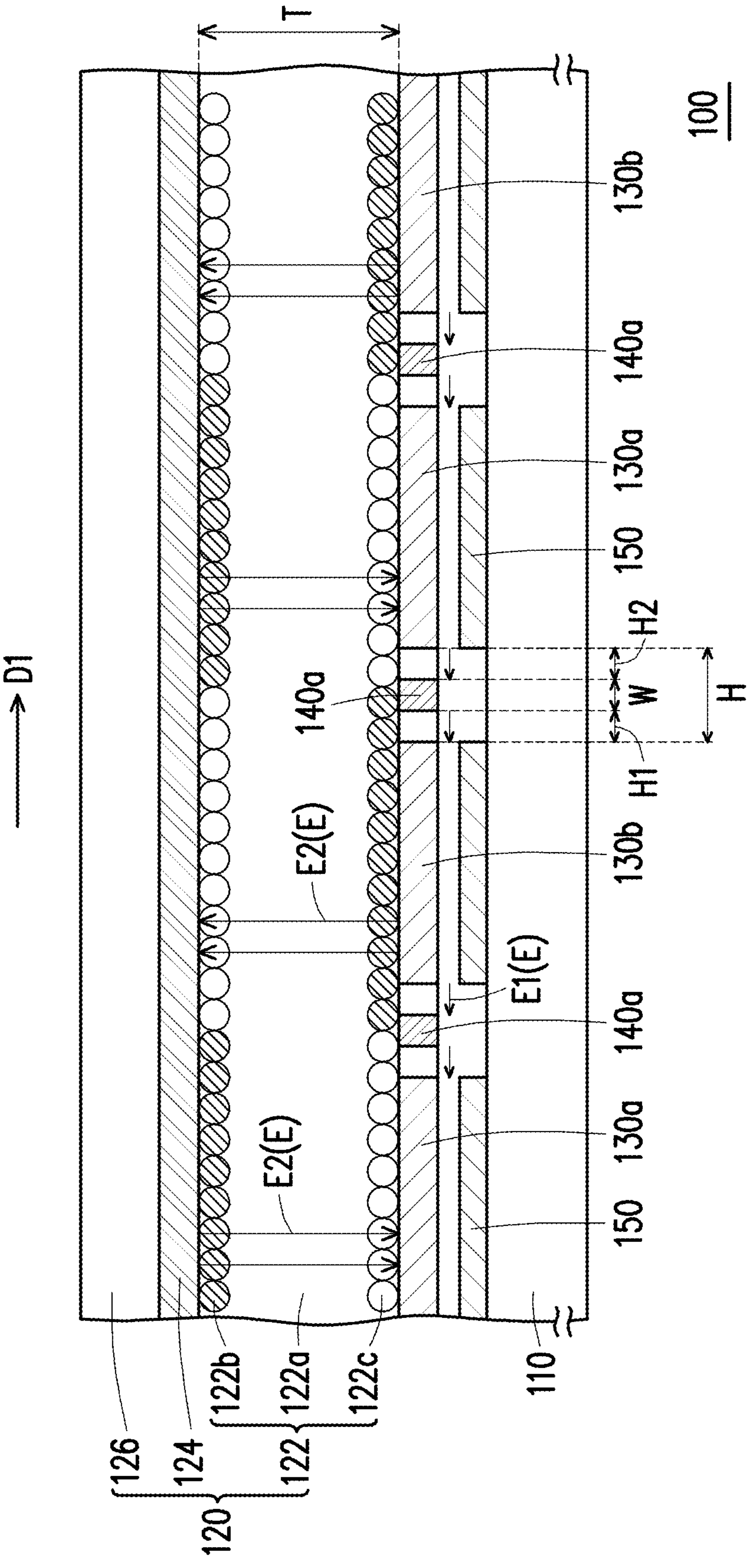
FIG. 1A is a cross-sectional view of an electrophoretic display device according to an embodiment of the invention.
Figure 1B:
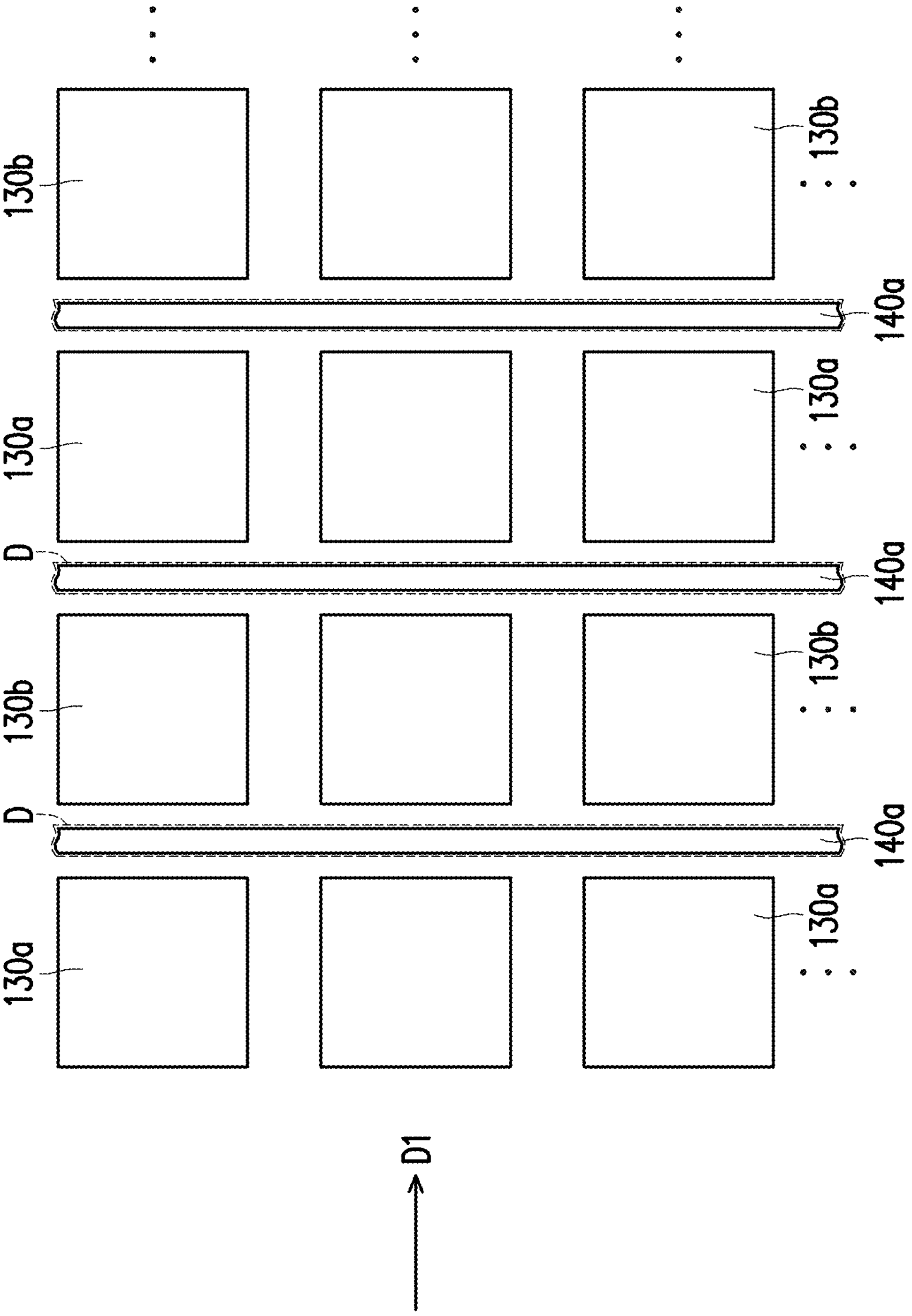
FIG. 1B is a top view of second electrodes and third electrodes of the electrophoretic display device of FIG. 1A.

FIG. 1A is a cross-sectional view of an electrophoretic display device according to an embodiment of the invention. FIG. 1B is a top view of second electrodes and third electrodes of the electrophoretic display device of FIG. 1A. Please refer to FIG. 1A and FIG. 1B at the same time. In the present embodiment, an electrophoretic display device 100 includes a substrate 110, an electrophoretic display film 120, a plurality of second electrodes 130*a* and 130*b*, and a plurality of third electrodes 140*a*. The electrophoretic display film 120 is disposed on the substrate 110 and includes a display medium layer 122 and a first electrode 124. The second electrodes 130*a* and 130*b* are separately disposed on the substrate 110 and located between the display medium layer 122 and the substrate 110. An electric field E is formed between the first electrode 124 and the second electrodes 130*a* and 130*b*, and two adjacent second electrodes 130*a* and 130*b* have different polarities in a direction D1. The third electrodes 140*a* are disposed on the substrate 110 and located between the display medium layer 122 and the substrate 110. The third electrodes 140*a* and the second electrodes 130*a* and 130*b* are alternately disposed in the direction D1. A first voltage received by the second electrodes 130*a* and 130*b* is different from a second voltage received by the third electrodes 140*a*. Each of the third electrodes 140*a* is used to block a horizontal electric field E1 between two adjacent second electrodes 130*a* and 130*b*. Here, the voltage of each of the second electrodes 130*a* and 130*b* is controlled by a corresponding thin-film transistor (TFT) 150 on the substrate 110, which means that the voltages of the second electrodes 130*a* and 130*b* may be the same or different, which are controlled by the corresponding TFT 150.

In detail, the substrate 110 is, for example, an active device array substrate, such as a TFT array substrate or a thin-film diode (TFD) array substrate, but is not limited thereto. The electrophoretic display film 120 further includes a flexible substrate 126, wherein the flexible substrate 126 is disposed on the first electrode 124, and the first electrode 124 is located between the flexible substrate 126 and the display medium layer 122. Here, the display medium layer 122 includes an electrophoretic fluid 122*a* and a plurality of charged particles of different colors distributed in the electrophoretic fluid, such as a plurality of black charged particles 122*b* and a plurality of white charged particles 122*c*. In an embodiment, the display medium layer 122 is preferably a display medium layer with a microcup structure, but is not limited thereto. In another embodiment, the display medium layer 122 may also be a display medium layer with a microcapsule structure. In an embodiment, the first electrode 124 receives the second voltage, which means that the third electrodes 140*a* and the first electrode 124 receive the same voltage. In another embodiment, the first electrode 124 may receive a third voltage, which means that the second electrodes 130*a* and 130*b*, the third electrodes 140*a*, and the first electrode 124 respectively receive different voltages.

Please refer further to FIG. 1A and FIG. 1B. In the present embodiment, the first electrode 124 is a common electrode, the second electrodes 130*a* and 130*b* are a plurality of display electrodes, and the third electrodes 140*a* are a plurality of barrier electrodes. The shape of each of the second electrodes 130*a* and 130*b* is, for example, a rectangle, and the second electrodes 130*a* and 130*b* are arranged in an array. The shape of each of the third electrodes 140*a* is, for example, a strip, and the third electrodes 140*a* are arranged along the direction D1. Preferably, the extending direction of the third electrodes 140*a* is parallel to the extending direction of a data line D. Here, the third electrodes 140*a* and the second electrodes 130*a* and 130*b* are alternately arranged in the direction D1, but are not limited thereto.

As shown in FIG. 1A, there is a horizontal spacing H between two adjacent second electrodes 130*a* and 130*b*, and the horizontal spacing H is, for example, between 6 μm and 45 μm. The horizontal spacings H1 and H2 between each of the third electrodes 140*a* and two adjacent second electrodes 130*a* and 130*b* are the same. That is, the horizontal spacing H2 between the third electrodes 140*a* and the second electrode 130*a* is equal to the horizontal spacing H1 between the third electrodes 140*a* and the second electrode 130*b*. Preferably, the horizontal spacing H is, for example, 21 microns, and a width W of each of the third electrodes 140*a* is equal to the horizontal spacings H1 and H2. That is, the horizontal spacing H1, the horizontal spacing H2, and the width W of each of the third electrodes 140*a* are all 7 microns. In other embodiments, the width W of each of the third electrodes 140*a* may also be greater or less than the horizontal spacing H1 and H2, which still belongs to the scope of the invention. In addition, in an embodiment, the material of the third electrodes 140*a* may be the same as the material of the second electrodes 130*a* and 130*b*, which means that the second electrodes 130*a* and 130*b* and the third electrodes 140*a* belong to the same layer during the manufacturing process, and are, for example, transparent conductive materials, such as indium oxide, tin oxide, indium tin oxide, or indium zinc oxide, but are not limited thereto. In another embodiment, the material of the third electrodes 140*a* is different from the material of the second electrodes 130*a* and 130*b*. The material of the third electrodes 140*a* is, for example, metal, such as copper or aluminum, or other non-transparent conductive materials. In another embodiment, the material of the third electrodes 140*a* may be the same as the material of the first electrode 124. In short, the materials of any two of the first electrode 124, the second electrodes 130*a* and 130*b*, and the third electrodes 140*a* are the same.

In an embodiment, when a thickness T of the display medium layer 122 is, for example, 23 microns, and the width W of each of the third electrodes 140*a* is, for example, 7 microns, no electric field is generated between the third electrodes 140*a* and the first electrode 124, and the electric field at the horizontal spacings H1 and H2 on the opposite sides of the third electrodes 140*a* is 3 E. The electric field at the horizontal spacings H1 and H2 is limited by the third electrodes 140*a*, so that the horizontal electric field E1 here may not pass through, thereby suppressing the generation of blooming effect. In an embodiment, the extending direction of the third electrodes 140*a* is parallel to the data line D, and a gate-on and gate-off timing adjustment technique is added to reduce blooming phenomenon between gates. Further-more, the configuration of the third electrodes 140*a* also reduces the horizontal electric field E1 between two adjacent second electrodes 130*a* and 130*b*. In addition, since a weak electric field area is not generated between two adjacent display electrodes 130*a* and 130*b*, the electrophoretic display device 100 of the present embodiment may be driven at a low temperature.

In short, in the design of the electrophoretic display device 100 of the present embodiment, the third electrodes 140*a* and the second electrodes 130*a* and 130*b* are alternately arranged in the direction D1, and the first voltage received by the second electrodes 130*a* and 130*b* is different from the second voltage received by the third electrodes 140*a*. In this way, the configuration of the third electrodes 140*a* may block the horizontal electric field E1 between two adjacent second electrodes 130*a* and 130*b*, so as to avoid the generation of blooming effect. In addition, since a weak electric field area is not generated between two adjacent second electrodes 130*a* and 130*b* of the present embodiment, the electrophoretic display device 100 of the present embodiment may be driven at a low temperature. Therefore, the electrophoretic display device 100 of the present embodiment may effectively reduce blooming effect and has high resolution, and may also be used in a low-temperature environment and may have a wider temperature operating range, and may reduce inventory costs and thereby reduce production costs.

It should be mentioned here that, the following embodiments adopt the reference numerals of the embodiments above and a portion of the content thereof, wherein the same reference numerals are used to represent the same or similar elements and descriptions of the same technical content are omitted. The omitted portions are as described in the embodiments above and are not repeated in the embodiments below.

Figure 2:
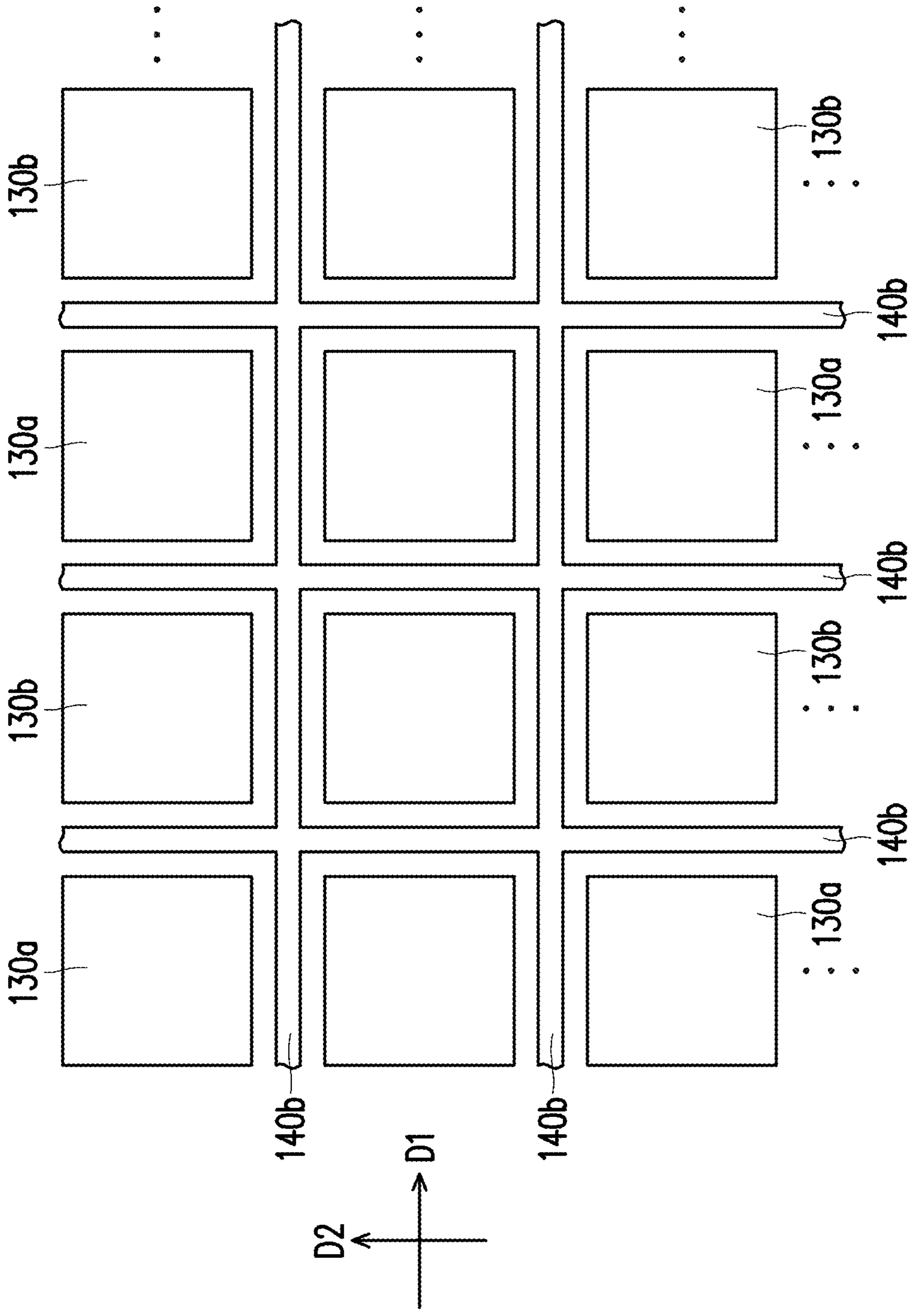
FIG. 2 is a top view of second electrodes and third electrodes according to another embodiment of the invention.

FIG. 2 is a top view of second electrodes and third electrodes according to another embodiment of the invention. Referring to FIG. 1B and FIG. 2 at the same time, the arrangement of the second electrodes 130*a* and 130*b* and third electrodes 140*b* of the present embodiment is similar to the arrangement of the second electrodes 130*a* and 130*b* and the third electrodes 140*a* of FIG. 1B, and the difference between the two is: in the present embodiment, the second electrodes 130*a* and 130*b* are arranged in an array, and the third electrodes 140*b* have a strip shape and are arranged in a grid shape. The second electrodes 130*a* and 130*b* and the third electrodes 140*b* are alternately arranged in the direction D1 and another direction D2 perpendicular to the direction D1. In other words, the configuration of the third electrodes 140*b* may surround each of the second electrodes 130*a* and 130*b* to more effectively avoid the generation of blooming effect.

Based on the above, in the design of the electrophoretic display device of the invention, the third electrodes and the second electrodes are alternately arranged in the direction, and the first voltage received by the second electrodes is different from the second voltage received by the third electrodes. In this way, the configuration of the third electrodes may block the horizontal electric field between two adjacent second electrodes, so as to avoid the generation of blooming effect. In addition, because the invention adopts the third electrodes instead of increasing the horizontal spacing between two adjacent second electrodes, the invention does not generate a weak electric field area between two adjacent second electrodes. Therefore, the invention is suitable to be driven at low temperatures. In short, the electrophoretic display device of the invention may effectively reduce blooming effect and has high resolution, and may also be used in a low-temperature environment and may have a wider temperature operating range.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An electrophoretic display device, comprising:

a first substrate;

an electrophoretic display film disposed on the first substrate and comprising a display medium layer and a first electrode;

a plurality of second electrodes separately disposed on the first substrate and located between the display medium layer and the first substrate, a first voltage received by each of the second electrodes is controlled by a corresponding thin-film transistor; and a plurality of third electrodes disposed on the first substrate and located between the display medium layer and the first substrate, wherein the third electrodes and the second electrodes are alternately disposed in a direction, the first voltage is different from a second voltage received by the third electrodes, and the third electrodes are a plurality of barrier electrodes which are not controlled by thin-film transistors under the display medium layer, wherein the first electrode receives the second voltage, wherein the second electrodes and the third electrodes are disposed at a same level, wherein the display medium layer comprises an electrophoretic fluid and a plurality of charged particles distributed in the electrophoretic fluid, and the charged particles are moved vertically, wherein a width of each of the third electrodes is less than a horizontal spacing between each of the third electrodes and the two adjacent second electrodes, wherein the electrophoretic display film further comprises a second substrate, the first electrode is disposed on a whole lower surface of the second substrate, the first electrode is located between the second substrate and the display medium layer, an area of orthographic projection of the first electrode on the first substrate is greater than an area of orthographic projection of the third electrode on the first substrate, and no electric field is generated between the third electrodes and the first electrode.

2. The electrophoretic display device of claim 1, wherein an extending direction of the second electrodes is parallel to an extending direction of a data line.

3. The electrophoretic display device of claim 1, wherein a horizontal spacing between the two adjacent second electrodes is between 6 μm and 45 μm.

4. The electrophoretic display device of claim 1, wherein a material of the third electrodes is the same as a material of the second electrodes.

5. The electrophoretic display device of claim 1, wherein the first electrode is a common electrode, the second electrodes are a plurality of display electrodes, and materials of any two of the first electrode, the second electrodes, and the third electrodes are the same.

6. The electrophoretic display device of claim 1, wherein the second electrodes are arranged in an array, and a shape of each of the third electrodes is a strip.

7. The electrophoretic display device of claim 1, wherein the second electrodes are arranged in an array and the third electrodes are arranged in a grid shape, and the second electrodes and the third electrodes are all alternately arranged in the direction and another direction perpendicular to the direction.

* * * * *